United States Patent
Chiu et al.

(10) Patent No.: US 9,976,628 B2
(45) Date of Patent: May 22, 2018

(54) POSITIONING STRUCTURE FOR WORM WHEEL

(71) Applicant: INNOSERV FA INC., Tortola, British Virgin Islands (BV)

(72) Inventors: Yu-Chuan Chiu, Taichung (TW); Chih-Meng Wu, Miaoli County (TW)

(73) Assignee: INNOSERV FA INC., Tortola (VG)

( * ) Notice: Subject to any disclaimer, the term of this patent is extended or adjusted under 35 U.S.C. 154(b) by 313 days.

(21) Appl. No.: 14/933,456

(22) Filed: Nov. 5, 2015

(65) Prior Publication Data

US 2017/0108083 A1    Apr. 20, 2017

(30) Foreign Application Priority Data

Oct. 15, 2015 (TW) ................... 104133856

(51) Int. Cl.
*F16H 1/16* (2006.01)
*F16H 55/24* (2006.01)

(52) U.S. Cl.
CPC ............. *F16H 1/163* (2013.01); *F16H 1/166* (2013.01); *F16H 55/24* (2013.01)

(58) Field of Classification Search
CPC ....................................... F16H 1/163
See application file for complete search history.

(56) References Cited

U.S. PATENT DOCUMENTS

| 4,648,286 A * | 3/1987 | Nemoto | F16H 1/163 74/425 |
| 2006/0156845 A1* | 7/2006 | Tong | F16H 1/163 74/425 |
| 2011/0000331 A1* | 1/2011 | Iwase | F16H 1/163 74/425 |

* cited by examiner

*Primary Examiner* — William Kelleher
*Assistant Examiner* — Gregory Prather

(57) ABSTRACT

A positioning structure for a worm wheel which is configured to mesh with a worm spindle and contains: a body, a plurality of rolling assemblies, and at least one attaching material. The body includes plural accommodating grooves and plural recesses, wherein each recess forms on a bottom face of each accommodating groove and communicating with said each accommodating groove. Each rolling assembly includes a holder, a rolling ball, and a magnetic attracting element, wherein a width of the holder is less than a width of said each accommodating groove so as to form a gap between the holder and said each accommodating groove. Each attaching material is filled in the gap, and said each rolling assembly is adjustably moved to a fixing position of said each accommodating groove by using said each recess, such that said each attaching material locates the holder in said each accommodating groove.

4 Claims, 5 Drawing Sheets

POSITIONING STRUCTURE FOR WORM WHEEL

FIELD OF THE INVENTION

The present invention relates to a worm wheel, and more particularly to a positioning structure for a worm wheel which manufactures the worm wheel easily, assembles the worm wheel accurately, and reduces assembly cost of the worm wheel.

BACKGROUND OF THE INVENTION

A transmission system of a machine contains a gear box configured to reduce a rotating speed of a motor to a set value, thus obtaining a large output torque. Taking a worm spindle gearbox for example, it contains at least one gear and a worm spindle meshing with the at least one gear, so the machine has high torque, high reduction ratio, and is manufactured easily, but abrasion, backlash, and poor positioning accuracy occur.

To overcome above-mentioned problems, a conventional roller drive is disclosed in U.S. Pat. No. 7,793,567 and contains a rolling column configured on an outer periphery of a rotary disc and contains a worm spindle meshing with the rolling column. The worm spindle meshes with the rolling column linearly, so high torque, high reduction ratio, low abrasion, zero backlash, and excellent positioning accuracy occur to the machine. However, this roller drive is manufactured at expensive cost, because an accuracy of spaced angle (indexing difference) of the fixing groove of the rolling column is required so as to drive a smooth rotation of the rotary disc.

A conventional ball drive is disclosed in U.S. Pat. No. 8,549,947 and contains plural rolling balls for replacing the rolling column. Nevertheless, the ball drive is assembled difficultly, since the plural rolling balls are fixed in a plurality of accommodating grooves of the rotary disc and roll in plural trenches of the worm spindle smoothly. Accordingly, machining accuracy (such as 1 μm) of each accommodating groove is required, thus increasing machining cost and difficulty.

The present invention has arisen to mitigate and/or obviate the afore-described disadvantages.

SUMMARY OF THE INVENTION

The primary objective of the present invention is to provide a positioning structure for a worm wheel which contains plural accommodating grooves, each accommodating groove communicates with a recess which forms on a bottom face of said each accommodating groove, and a gap is defined between a holder of each of plural rolling assemblies and said each accommodating groove, such that automation equipment (such as a robotic arm) is inserted into said each accommodating groove to directly position the holder in three axes and to move a rolling ball or a rotary column toward a fixing position of said each accommodating groove easily and precisely.

Another objective of the present invention is to provide a positioning structure for a worm wheel which manufactures the worm wheel easily, assembles the worm wheel accurately, and reduces assembly cost of the worm wheel.

To obtain the above objective, a positioning structure for a worm wheel provided by a first embodiment of the present invention is configured to mesh with a worm spindle and contains: a body, a plurality of rolling assemblies, and at least one attaching material.

The body includes plural accommodating grooves defined around an outer periphery thereof, and the body also includes plural recesses, each recess forms on a bottom face of each accommodating groove and communicating with said each accommodating groove.

Each rolling assembly includes a holder disposed in said each accommodating groove, a rolling ball placed in the holder and extending out of the outer periphery of the body, and a magnetic attracting element mounted in the holder adjacent to the rolling ball, wherein a width of the holder is less than a width of said each accommodating groove so as to form a gap between the holder and said each accommodating groove.

Each of the at least one attaching material is filled in the gap between the holder and said each accommodating groove, wherein said each rolling assembly is adjustably moved to a fixing position of said each accommodating groove by using said each recess, and said each attaching material locates the holder in said each accommodating groove.

A positioning structure for a worm wheel provided by a second embodiment of the present invention is configured to mesh with a worm spindle and contains: a body, a plurality of rolling assemblies, and at least one attaching material.

The body includes plural accommodating grooves defined around an outer periphery thereof, and the body also includes plural recesses, each recess forms on a bottom face of each accommodating groove and communicating with said each accommodating groove.

Each rolling assembly includes a holder disposed in said each accommodating groove, and said each rolling assembly includes a rotary column rotatably connected with the holder and extending out of the outer periphery of the body, wherein a width of the holder is less than a width of said each accommodating groove so as to form a gap between the holder and said each accommodating groove.

Each of the at least one attaching material is filled in the gap between the holder and said each accommodating groove, wherein said each rolling assembly is adjustably moved to a fixing position of said each accommodating groove by using said each recess, and said each attaching material locates the holder in said each accommodating groove.

Thereby, said each rolling assembly is manufactured in a mold opening manner so as to reduce a tolerance of said each rolling assembly, thus forming the holder and the rolling ball precisely. In addition, the ultraviolet ray lamp irradiates said each attaching material to solidify the holder in said each accommodating groove and to obtain low shrinkage, skid resistance, and high adhesion of said each attaching material. Thereafter, surplus glue in said each accommodating groove is removed, the worm wheel is delivered into baking equipment so as to solidify said each attaching material completely, thus fixing said each rolling assembly in said each accommodating groove of the body securely and easily.

DETAILED DESCRIPTION OF THE PREFERRED EMBODIMENTS

Figure 1:
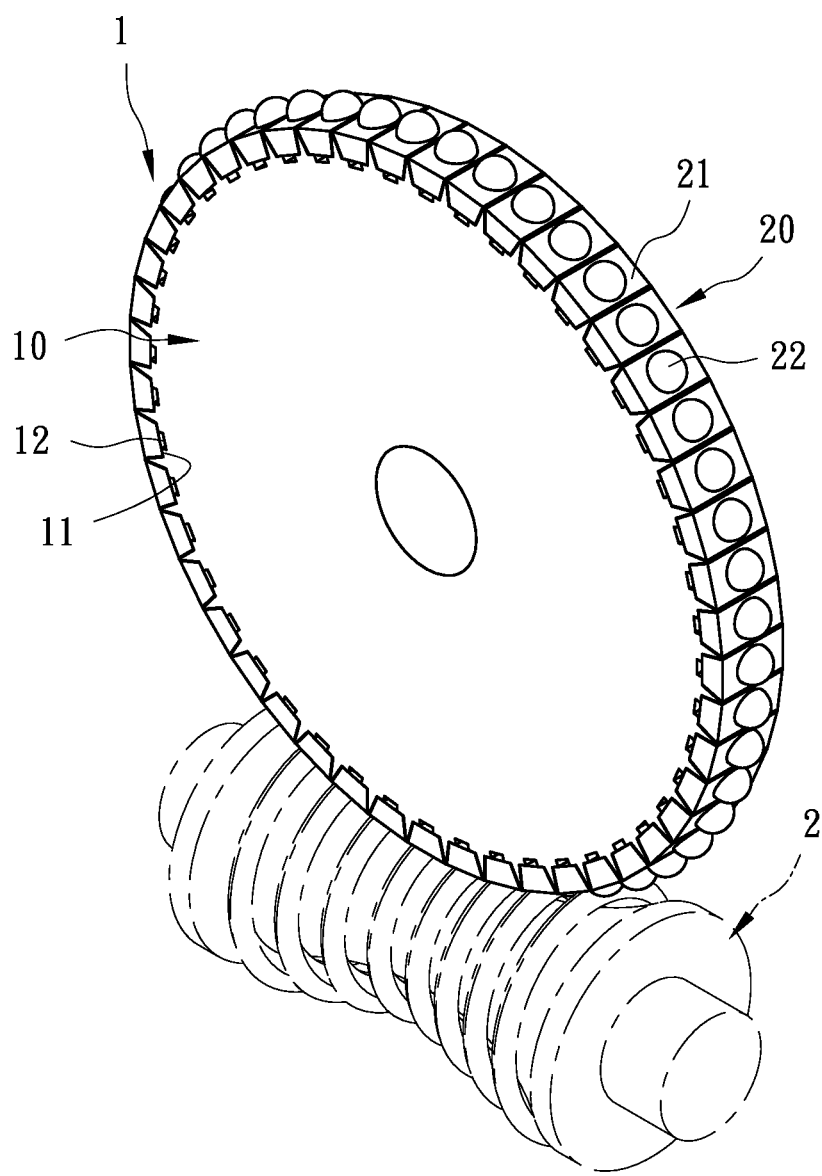
FIG. 1 is a perspective view showing the assembly of a positioning structure for a worm wheel according to a first embodiment of the present invention.
Figure 2:
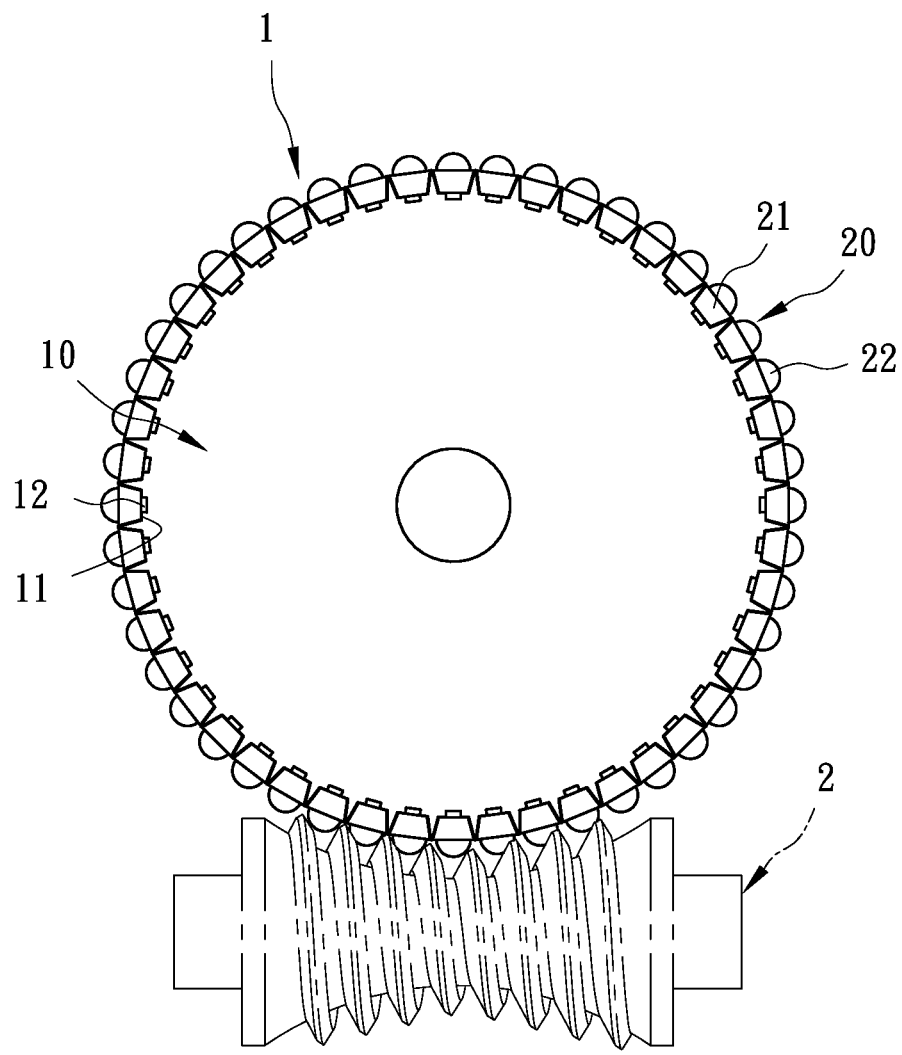
FIG. 2 is a side plane view showing the assembly of the positioning structure for the worm wheel according to the first embodiment of the present invention.

With reference to FIGS. 1 and 2, a positioning structure for a worm wheel 1 according to a first embodiment of the present invention, wherein the worm wheel 1 is configured to mesh with a worm spindle 2 so as to drive a mechanical structure and comprises a body 10, a plurality of rolling assemblies 20, and at least one attaching material 30.

Figure 3:
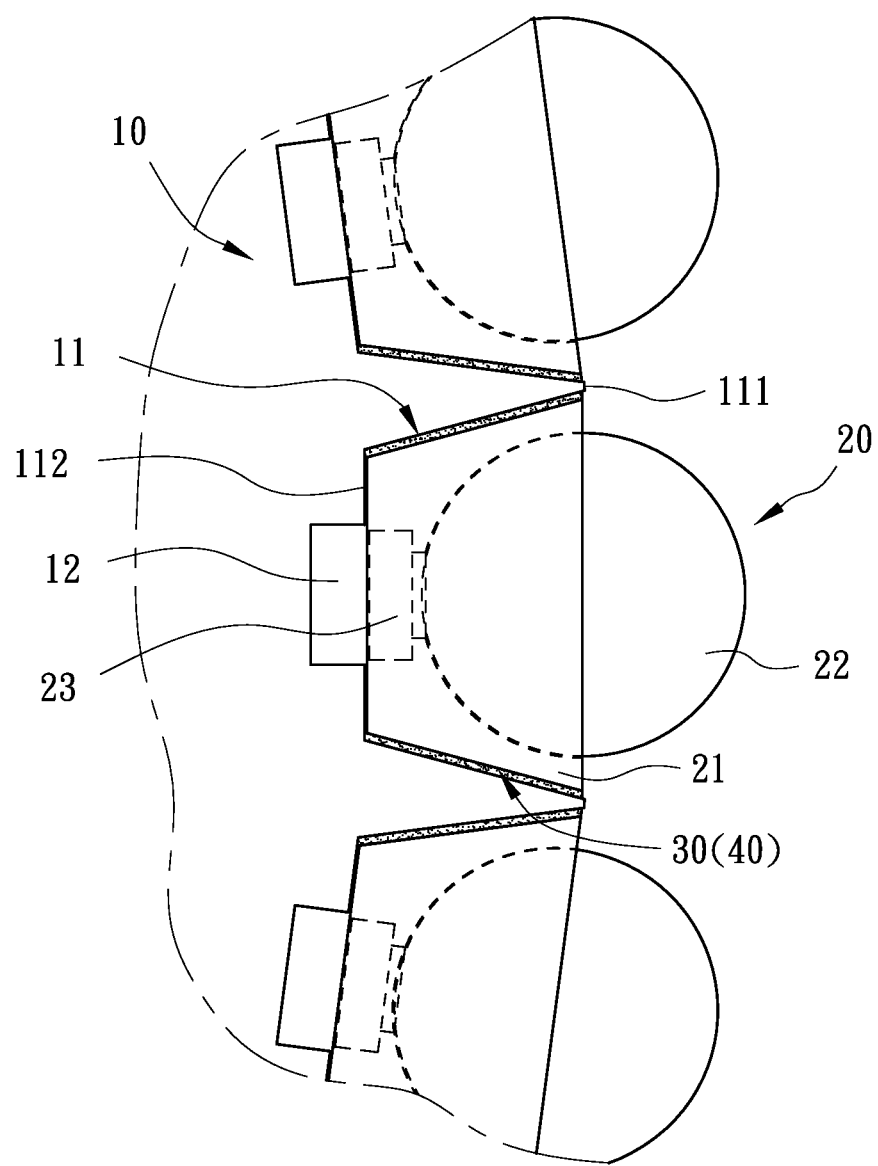
FIG. 3 is an amplified plane view showing the assembly of a part of the positioning structure for the worm wheel according to the first embodiment of the present invention.

Referring to FIG. 3, the body 10 includes plural accommodating grooves 11 defined around an outer periphery 111 thereof, and the body 10 also includes plural recesses 12, each recess 12 forms on a bottom face 112 of each accommodating groove 11 and communicates with said each accommodating groove 11. In this embodiment, said each accommodating groove 11 is trapezoidal and has a top face and the bottom face 112, wherein a width of the top face of said each accommodating groove 11 is greater than that of the bottom face of said each accommodating groove 11, and said each accommodating groove 11 is stamp formed or is broached.

Each rolling assembly 20 includes a holder 21 disposed in said each accommodating groove 11, a rolling ball 22 fixed in the holder 21 and extending out of the outer periphery 111 of the body 10, and a magnetic attracting element 23 mounted in the holder 21 adjacent to the rolling ball 22, such that the magnetic attracting element 23 attracts the rolling ball 22 in the holder 21 securely. A width of the holder 21 is less than a width of said each accommodating groove 11 so as to form a gap 40 between the holder 21 and said each accommodating groove 11, wherein a size of the gap 40 is 10 to 30 μm so as to position the holder 21 in said each accommodating groove 11, and the holder 21 is moved within an adjusting margin of said each accommodating groove 11. Furthermore, said each rolling assembly 20 is manufactured in a mold opening manner so as to reduce a tolerance of said each rolling assembly 20, thus forming the holder 21 and the rolling ball 22 precisely. Preferably, the magnetic attracting element 23 is housed in the holder 21.

Each of the at least one attaching material 30 is filled in the gap 40 between the holder 21 of said each rolling assembly 20 and said each accommodating groove 11 of the body 10, wherein said each rolling assembly 20 is adjustably moved to a fixing position of said each accommodating groove 11 by using said each recess 12, and said each attaching material 30 locates the holder 21 in said each accommodating groove 11. In this embodiment, said each attaching material 30 contains ultraviolet ray glue (UV glue) and other composites, said each attaching material 30 is irradiated by a ultraviolet ray lamp (UV lamp) in 1 to 5 seconds for solidification and it adheres the holder 21 in 20 to 30 seconds, hence said each attaching material 30 has low shrinkage, skid resistance, and high adhesion.

In assembly, the body 10 is machined roughly to produce said each accommodating grooves 11, i.e., a high accuracy of said each accommodating groove 11 is not required, and said each attaching material 30 is filled into said each accommodating groove 11, thereafter the holder 21 in which the rolling ball 22 is fixed, is disposed in said each accommodating groove 11. Due to said each accommodating groove 11 is in communication with said each recess 12 and the gap 40 forms between the holder 21 and said each accommodating groove 11, automation equipment (such as a robotic arm) in inserted into said each accommodating groove 11 to position the holder 21 in three axes and to move the rolling ball 22 toward the fixing position of said each accommodating groove 11. In addition, the ultraviolet ray lamp irradiates said each attaching material 30 to solidify the holder 21 in said each accommodating groove 11, surplus glue in said each accommodating groove 11 is removed, and the worm wheel 1 is delivered into baking equipment so as to solidify said each attaching material 30 completely, thus fixing said each rolling assembly 20 in said each accommodating groove 11 of the body 10 securely and easily.

It is to be noted that the holder 21 can be also positioned in said each accommodating groove 11 in a laser welding manner.

Figure 4:
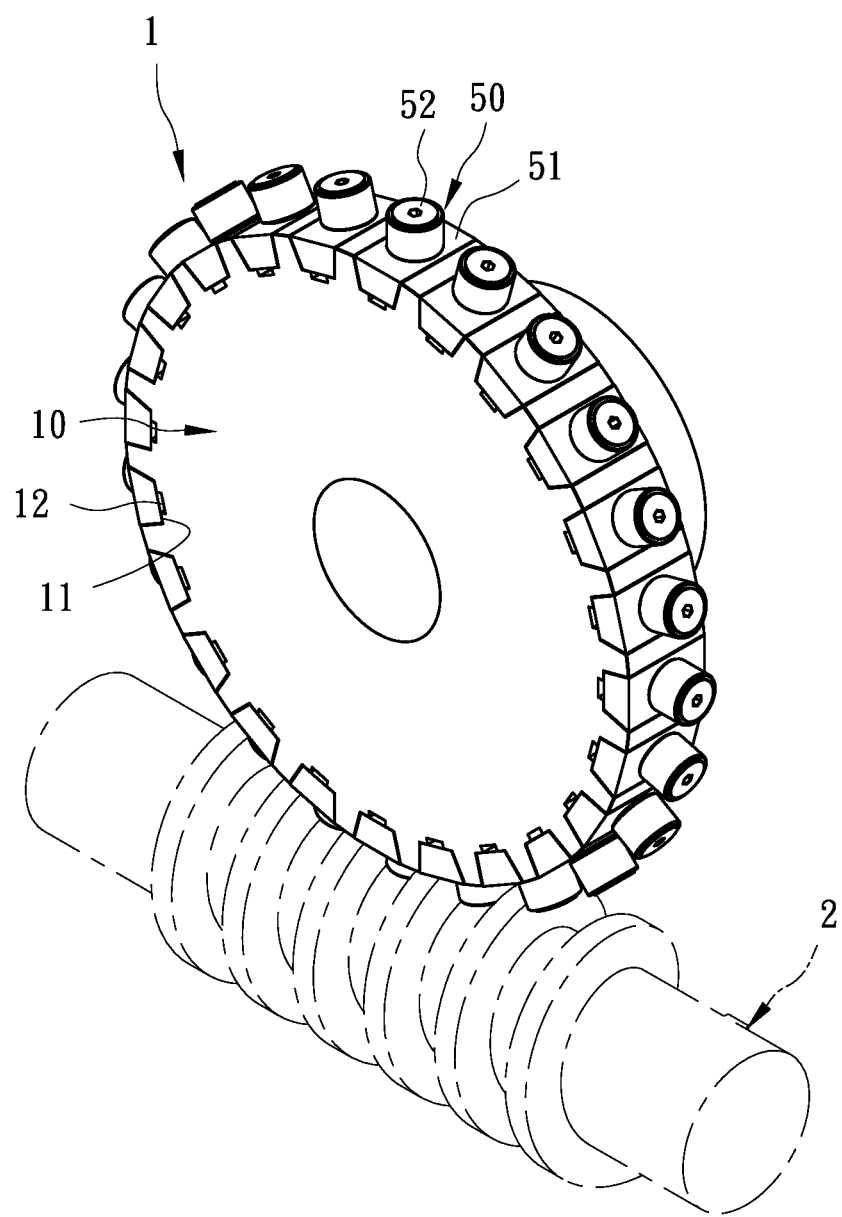
FIG. 4 is a perspective view showing the assembly of a positioning structure for a worm wheel according to a second embodiment of the present invention.
Figure 5:
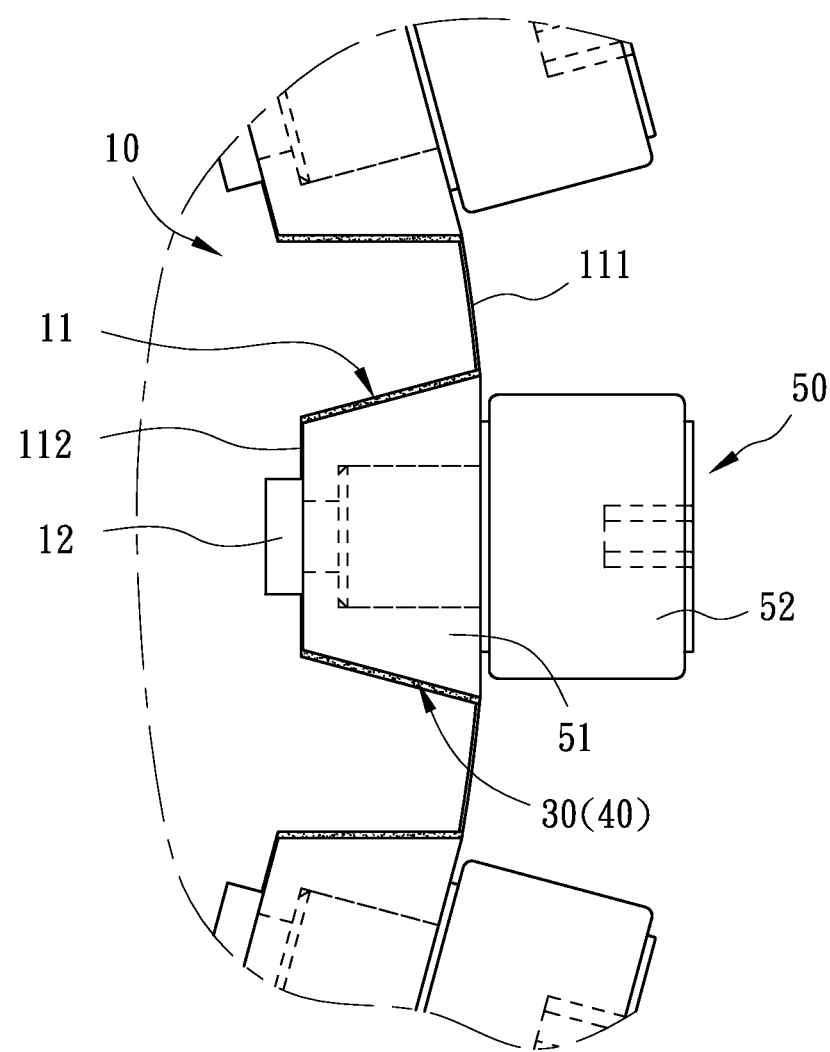
FIG. 5 is an amplified plane view showing the assembly of a part of the positioning structure for the worm wheel according to the second embodiment of the present invention.

As illustrated in FIGS. 4 and 5, a positioning structure for a worm wheel 1 according to a second embodiment of the present invention, wherein the worm wheel 1 is configured to mesh with a worm spindle 2 so as to drive a mechanical structure and comprises a body 10, a plurality of rolling assemblies 20, and at least one attaching material 30. A difference of the worm wheel 1 of the second embodiment from that of the first embodiment contains: each rolling assembly 20 including a holder 51 disposed in each of plural accommodating grooves 11, and said each rolling assembly 20 also including a rotary column 52 rotatably connected with the holder 51 and extending out of an outer periphery 111 of a body 10, wherein a width of the holder 51 is less than that of said each accommodating groove 11 so as to form a gap 40 between the holder 51 and said each accommodating groove 11, and wherein the rotary column 52 is rotatably screwed with the holder 51.

Thereby, the rolling ball 22/52 and the holder 21/51 of said each rolling assembly 20/50 are fixed in said each accommodating groove 11 precisely, i.e., a positioning precision of the rolling ball 22/52 and the holder 21/51 is 1 μm, and the rolling ball 22/52 and the holder 21/51 are solidified and positioned on the body 10, thus assembling the worm wheel 1 accurately and easily. Furthermore, said each rolling assembly 20/50 is adjustably moved to the fixing position of said each accommodating groove 11 by using said each recess 12, and the size of the gap 40 is 10 to 30 μm so as to locate said each rolling assembly 20/50 in said each accommodating groove 11, and a differential indexing of the rolling ball 22/52 is accurate to assemble the worm wheel 1 accurately and to overcome a tolerance of the rolling ball 22/52 easily.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A positioning structure for a worm wheel which is configured to mesh with a worm spindle and comprises:

a body including plural accommodating grooves defined around an outer periphery thereof, and the body also including plural recesses, each recess forming on a bottom face of each accommodating groove and communicating with said each accommodating groove;

a plurality of rolling assemblies, each rolling assembly including a holder disposed in said each accommodating groove, a rolling ball placed in the holder and extending out of the outer periphery of the body, and a magnetic attracting element mounted in the holder adjacent to the rolling ball, wherein a width of the holder is less than a width of said each accommodating groove so as to form a gap between the holder and said each accommodating groove;

at least one attaching material, and each of the at least one attaching material being filled in the gap between the holder and said each accommodating groove, wherein said each rolling assembly is adjustably moved to a fixing position of said each accommodating groove by using said each recess, and said each attaching material locates the holder in said each accommodating groove.

2. The positioning structure for the worm wheel as claimed in claim 1, wherein a size of the gap between the holder and said each accommodating groove is 10 to 30 μm.

3. The positioning structure for the worm wheel as claimed in claim 1, wherein said each attaching material contains ultraviolet ray glue (UV glue).

4. The positioning structure for the worm wheel as claimed in claim 3, wherein said each attaching material is irradiated by a ultraviolet ray lamp (UV lamp) for solidification and it adheres the holder, such that said each rolling assembly is fixed in said each accommodating groove of the body.

* * * * *